Nov. 24, 1931.  T. K. CUMMINS  1,833,278
HAND BRAKE WHEEL
Filed Jan. 25, 1929
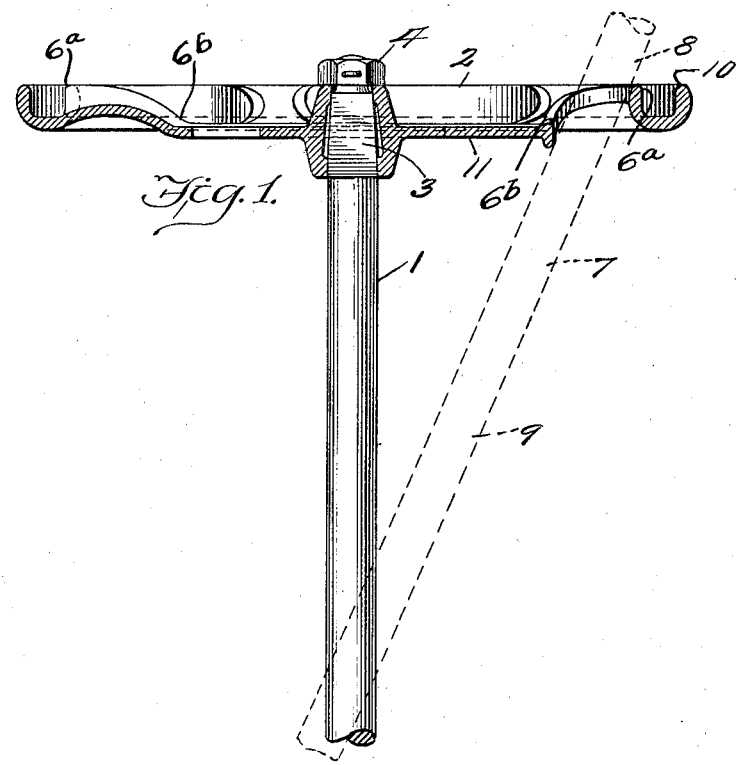
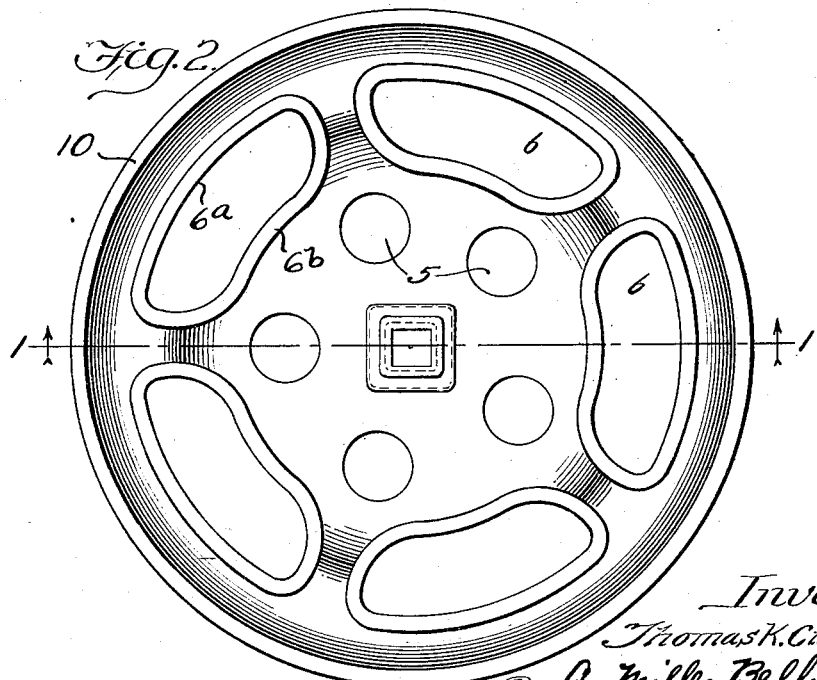
Inventor
Thomas K. Cummins
By A. Miller Belfield
Atty.

Patented Nov. 24, 1931

1,833,278

UNITED STATES PATENT OFFICE

THOMAS K. CUMMINS, OF ST. PAUL, MINNESOTA, ASSIGNOR TO NORTHERN MALLEABLE IRON COMPANY, OF ST. PAUL, MINNESOTA, A CORPORATION OF MINNESOTA

HAND BRAKE WHEEL

Application filed January 25, 1929. Serial No. 334,941.

My invention relates to hand brake wheels, particularly such as are used on hand brakes of railway freight cars.

The principal object of the invention is to provide a hand brake wheel which may be easily and inexpensively constructed and readily operated by hand, but which will prevent the use of "clubs" by the brakeman in operating the wheel to get more power on the brakes, a practice which is objectionable, as well known in the art.

In the accompanying drawings:

Fig. 1 is a view showing a hand brake wheel embodying my invention in cross section and also showing in elevation the upper portion of a brake rod on which the wheel is mounted, the section in this figure being taken on line 1—1 in Fig. 2;

Fig. 2 is a plan view of the wheel.

Referring to the drawings, I show a brake rod or staff 1, understood to be mounted on a freight car in any usual or preferred manner, and on the upper end of this staff or shaft 1, I show a hand wheel 2 embodying my invention, the staff being for convenience provided with an upper square end 3 and a nut 4 being provided to hold the hand brake wheel in position.

The hand wheel 2 is preferably formed of a disk 11 with an upturned circumferential flange 10 provided with a series of openings 6 parallel with and concentric to the rim flange 10 to afford gripping the wheel more effectively.

Drain holes 5—5 are provided in the flat portion of the disk to carry off any rain or other precipitation; these holes are preferably formed in the disk 11 where they may be relatively large, that is to say, of sufficient diameter to guard against their being frozen over and thereby cease to function and located on a line straddling the center of the openings 6—6.

The apertures 6—6, are of such size and location and arrangement in the wheel as to prevent the brakeman's club from engaging the brake staff or shaft 1, at any but at such distance below, or from the wheel, as to make effective leverage impossible. Each of these apertures 6 is surrounded by a flange or rib, the outer part 6ª rising above the general plane of the webbed portion 11 and the inner part or portion 6ᵇ near the staff 1 of this rib depending or extending below the web, so that the outer portion 6ª is considerably higher than the inner portion 6ᵇ. Thus, if the club shown at 7 in dotted lines be thrust through the opening 6 it will be prevented by these rib portions 6ª and 6ᵇ from engaging the staff 1 at any but a disadvantageous acute angle (see Fig. 1), so that the portion 8 of the club 7 protruding through the opening and above the wheel will be of such proportion with respect to the portion 9 that no substantial leverage will be added by thus using a club to operate the wheel for setting the brakes and will tend to discourage the practice which is a harmful one, since the brake devices of this kind provide ample pressure of the brake shoe to the rail wheel if the hand wheel is grasped at the rim in the usual way.

It will be understood that changes and modifications may be made without departing from the spirit of the invention.

What I claim is:

A hand brake wheel having a substantially flat central portion and an elevated rim portion and also having hand holes arranged within the inner edge of the rim portion and forming between them connecting members for connecting the rim and central portions, said connecting portions being inclined downwardly and inwardly between the rim and central portions.

In witness whereof, I hereunto subscribe my name this 22 day of January, A. D., 1929.

THOMAS K. CUMMINS.